(12) United States Patent
Avaldi

(10) Patent No.: US 11,519,383 B2
(45) Date of Patent: Dec. 6, 2022

(54) WIND TURBINE BLADE WITH A PLURALITY OF SHEAR WEBS

(71) Applicant: BLADE DYNAMICS LIMITED, Eastleigh (GB)

(72) Inventor: Andrea Avaldi, Eastleigh (GB)

(73) Assignee: BLADE DYNAMICS LIMITED, Eastleigh (GB)

( * ) Notice: Subject to any disclaimer, the term of this patent is extended or adjusted under 35 U.S.C. 154(b) by 0 days.

(21) Appl. No.: 17/284,148

(22) PCT Filed: Oct. 24, 2019

(86) PCT No.: PCT/EP2019/078977
§ 371 (c)(1),
(2) Date: Apr. 9, 2021

(87) PCT Pub. No.: WO2020/089024
PCT Pub. Date: May 7, 2020

(65) Prior Publication Data
US 2021/0332790 A1    Oct. 28, 2021

(30) Foreign Application Priority Data
Oct. 29, 2018 (GB) ..................... 1817598

(51) Int. Cl.
*F03D 1/06* (2006.01)
(52) U.S. Cl.
CPC ...... *F03D 1/0675* (2013.01); *F05B 2240/301* (2013.01); *F05B 2240/302* (2013.01); *Y02E 10/72* (2013.01)

(58) Field of Classification Search
CPC ................... F03D 1/0675; F05B 2240/302
See application file for complete search history.

(56) References Cited

U.S. PATENT DOCUMENTS

| 8,425,195 B2 * | 4/2013 | Rudling | ................ F03D 1/0675 |
| | | | 416/226 |
| 10,273,936 B2 * | 4/2019 | Feigl | ....................... F03D 13/40 |
| 10,519,928 B2 * | 12/2019 | Yarbrough | ............ F03D 1/0675 |
| 10,830,207 B2 * | 11/2020 | Merzhaeuser | .......... F03D 80/30 |

(Continued)

FOREIGN PATENT DOCUMENTS

| WO | 2009034291 A2 | 3/2009 |
| WO | 2013021236 A1 | 2/2013 |
| WO | 2014094780 A1 | 6/2014 |

OTHER PUBLICATIONS

Great Britain Search and Exam Report dated Apr. 10, 2019 corresponding to application No. GB1817598.4.

*Primary Examiner* — Woody A Lee, Jr.
*Assistant Examiner* — Wesley Le Fisher
(74) *Attorney, Agent, or Firm* — Nath, Goldberg & Meyer; Jerald L. Meyer; Tanya E. Harkins

(57) ABSTRACT

The present invention relates to a wind turbine blade (10) comprising a shell body with at least one pressure side shell member (36) and at least one suction side shell member (38), and a plurality of shear webs (70) arranged within the shell body. The plurality of shear webs (70) is successively arranged spanwise within the shell body such that adjacent shear webs overlap along part of their spanwise extent (L), wherein a gap (88) in the chordwise direction is provided between adjacent shear webs (70).

14 Claims, 4 Drawing Sheets

(56) References Cited

U.S. PATENT DOCUMENTS

Figure 1:
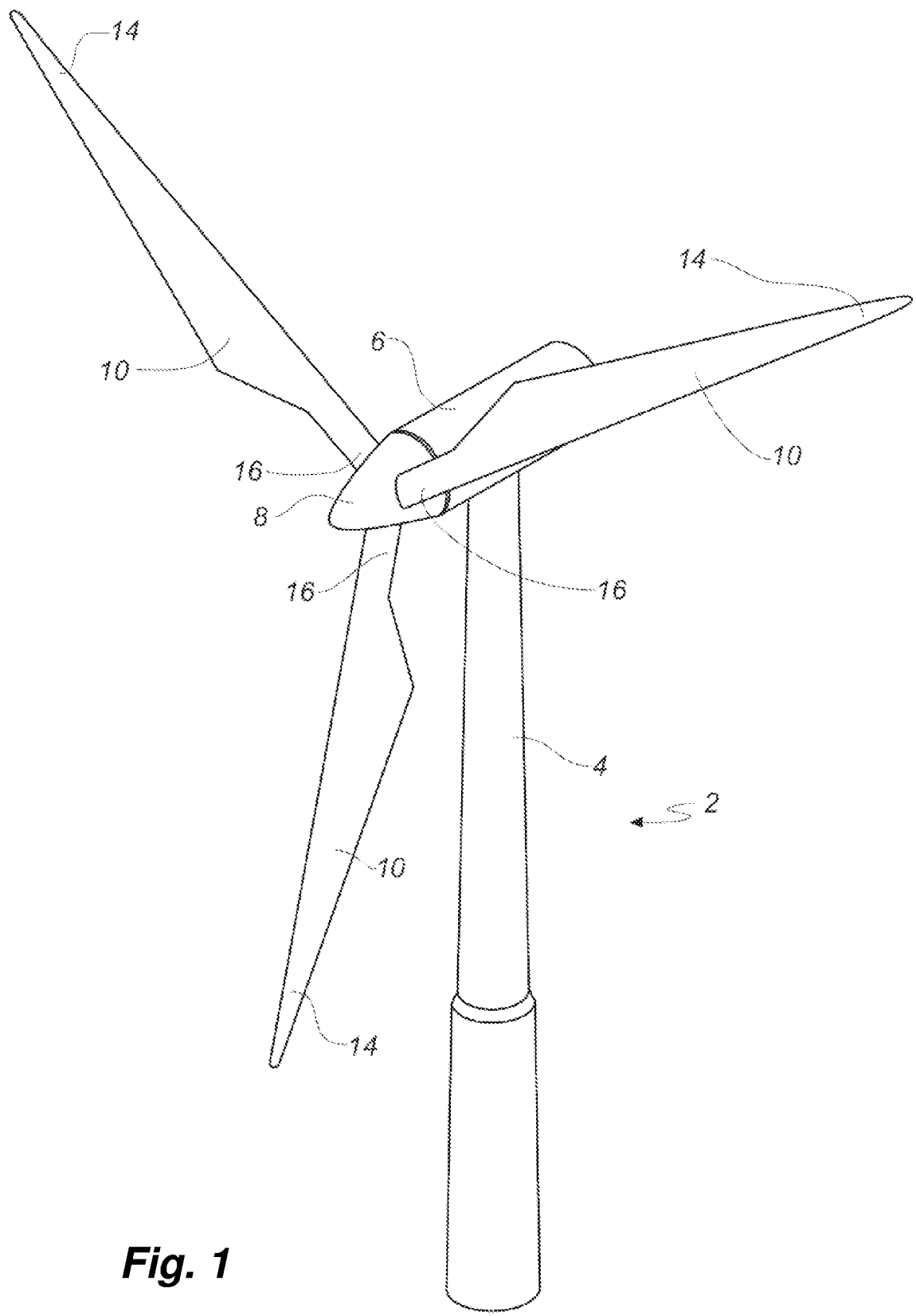

| | | | |
|---|---|---|---|
| 2011/0158788 A1* | 6/2011 | Bech | F03D 1/0675 |
| | | | 415/1 |
| 2013/0075025 A1 | 3/2013 | Guitton | |
| 2014/0286780 A1* | 9/2014 | Lemos | F03D 1/0633 |
| | | | 416/210 R |
| 2017/0021575 A1* | 1/2017 | Hansen | B29C 70/443 |
| 2018/0355843 A1* | 12/2018 | Yarbrough | F03D 1/0683 |
| 2021/0215133 A1* | 7/2021 | Smith | F03D 1/0675 |
| 2021/0270232 A1* | 9/2021 | Hoffmann | F03D 1/0675 |

* cited by examiner

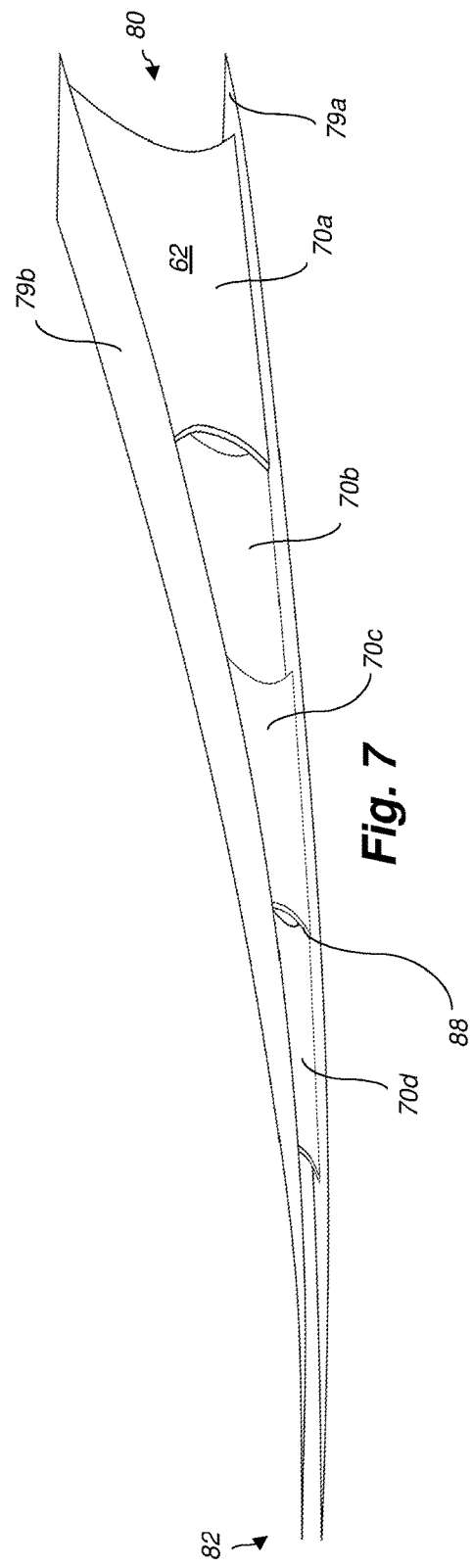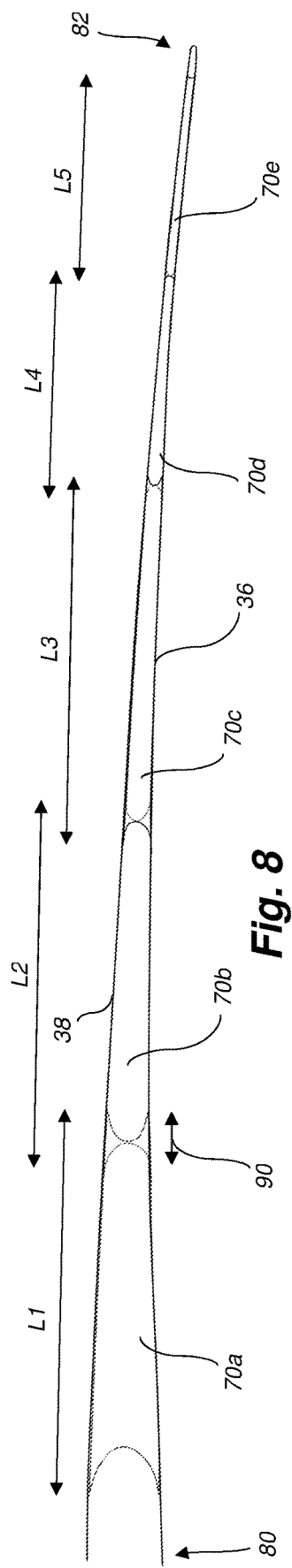

WIND TURBINE BLADE WITH A PLURALITY OF SHEAR WEBS

This is a National Phase Application filed under 35 U.S.C. 371 as a national stage of PCT/EP2019/078977, filed Oct. 24, 2019, an application claiming the benefit of Great Britain Application No. 1817598.4, filed Oct. 29, 2018, the content of each of which is hereby incorporated by reference in its entirety.

FIELD OF THE INVENTION

The present invention relates to a wind turbine blade with a plurality of shear webs and to a method for assembling a wind turbine blade at least from a first and a second blade segment.

BACKGROUND OF THE INVENTION

Wind power provides a clean and environmentally friendly source of energy. Modern wind turbines usually comprise a tower, generator, gearbox, nacelle, and one or more rotor blades. The wind turbine blades capture kinetic energy of wind using known foil principles. Modern wind turbines may have rotor blades that exceed 90 meters in length.

Wind turbine blades are usually manufactured by forming two shell parts from layers of woven fabric and resin. Spar caps or main laminates are placed or integrated in the shell parts and are combined with shear webs to form a structural support member. Spar caps or main laminates may be joined to, or integrated within, the inside of the suction and pressure halves of the shell. The shear webs and spar caps or main laminates typically extend spanwise along the inside of the blade and are often I-shaped. An additional trailing edge shear web may also be incorporated into the blade.

The main laminates typically comprise a high number of fibre layers compared to the remainder of the blade and may form a local thickening of the wind turbine shell, at least with respect to the number of fibre layers. Thus, the main laminate may form a fibre insertion in the blade. In this design, the main laminates constitute the load carrying structure. The blade shells are typically designed with a first main laminate integrated in the pressure side shell part and a second main laminate integrated in the suction side shell part. The first main laminate and the second main laminate are typically connected via one or more shear webs, which for instance may have a C-shaped or I-shaped cross-section. For very long blades, the blade shells may further along at least a part of the longitudinal extent comprise an additional first main laminate in the pressure side shell, and an additional second main laminate in the suction side shell. These additional main laminates may also be connected via one or more shear webs. This design has the advantage that it is easier to control the aerodynamic shape of the blade via the moulding of the blade shell part.

The shear webs act to reinforce the blade structure and prevent excessive bending or buckling. Some blade designs use shear webs formed from beam members having I- or C-shaped cross-sections, the members having a main body with load-bearing flanges extending therefrom at opposed ends of the main body.

As the size of wind turbines increases, the manufacturing and assembly of blade parts, such as the shell body and shear webs, becomes more challenging and costly. To address this, it is known to provide the wind turbine blade in two or more segments. This may result in an easier manufacturing process and may reduce the costs of transportation and erecting of wind turbines. The blade segments may be transported to the erection site where they can be assembled to form the wind turbine blade. However, a number of challenges is associated with such design, relating not only to the joining of the shell segments, but in particular to the design load bearing structures such as shear webs.

US 2013/0091705 A1 discloses a method for assembling a wind turbine blade from two blade segments comprising spar caps along pressure and suction side shell members, and a shear web that spans between the spar caps. The blade segments are joined along joint lines that include an exposed section of the shear web that extends span-wise beyond a respective spar cap at one of the pressure or suction side shell members, and a section of the opposite spar cap that extends span-wise beyond the shear web at the opposite one of the suction or pressure side shell member. Angled shear web faces define an angled joint line for joining the shear web between the shell members.

Known techniques of aligning and joining different shear web parts to provide adequate bonding can be time-consuming and tedious. Thus, there is a need for an improved blade and shear web design, in particular for segmented wind turbine rotor blades, enabling a stable, simple and cost-efficient assembly.

It is therefore an object of the present invention to provide a wind turbine blade with improved stability, easy manufacturing, handling and assembly.

It is another object of the present invention to provide an efficient method for assembling a wind turbine blade at least from a first and a second blade segment for forming a shear web for a wind turbine blade.

SUMMARY OF THE INVENTION

It has been found that one or more of the aforementioned objects can be obtained by a wind turbine blade having a profiled contour including a pressure side and a suction side, and a leading edge and a trailing edge with a chord having a chord length extending therebetween, the wind turbine blade extending in a spanwise direction between a root end and a tip end, wherein the blade comprises a shell body with at least one pressure side shell member and at least one suction side shell member, and a plurality of shear webs arranged within the shell body, each shear web comprising an end surface facing the tip end and an opposing end surface facing the root end of the blade, wherein each shear web comprises a recess in the end surface facing the tip end and/or a recess in the opposing end surface facing the root end of the blade, the recess preferably having a parabolic or semi-circular shape as seen in a side view of the shear web, the plurality of shear webs being successively arranged spanwise within the shell body such that adjacent shear webs overlap along part of their spanwise extent (L), the overlap including one recess facing the tip end, formed in one shear web, and one recess facing the root end, formed in the adjacent shear web, wherein a gap in the chordwise direction is provided between adjacent shear webs.

The present inventors have found that this arrangement including the overlapping recesses is advantageously configured to ensure a smooth transfer of loads into and out of the web. Thus, the recesses avoid stress concentrations due to abrupt changes in the geometry. The recesses may be machined into the ends of the web. The recesses are configured for transferring load from one shear web to its adjacent shear web.

The shape of the recess may be defined by a base section and opposing tip sections, each tapering towards the end of the shear web, as seen from the side. It is preferred that adjacent shear webs overlap such that the most inward point of the recess facing the tip end, formed in one shear web, i.e. usually the midpoint of the base or parabola of the recess, does not extend further than 1000 mm, 500 mm, 250 mm, or most preferred 100 mm beyond the most inward point of the recess facing the root end, formed in the adjacent shear web. It was found that such arrangement results in a particularly smooth transfer of load between the shear webs.

Preferably, each shear web comprises a recess in the end surface facing the tip end and a recess in the opposing end surface facing the root end of the blade, each recess having a parabolic or semi-circular shape as seen in a side view of the shear web.

It is preferred that the blade comprises 2-20 shear webs, more preferred 4-20, most preferred 4-16 shear webs. Usually, the plurality of shear webs are successively arranged spanwise along or next to a linear or curved path extending between the root end and the tip end of the blade, such that adjacent shear webs overlap along part of their spanwise extent. Thus, the shear web arranged closest to the root end of the blade may overlap with an adjacent shear web closer to the tip end of the blade. The latter may again overlap with the adjacent shear web yet closer to the tip end of the blade, and so on, up to the shear web closest to the tip end.

In some embodiments, a first subset of the plurality of shear webs forms a leading edge shear web arrangement or line-up, while a second subset of the plurality of shear webs forms a trailing edge shear web arrangement.

Advantageously, within said successive arrangement or line-up of shear webs along a linear or curved path, a gap in the chordwise direction is provided between adjacent shear webs. Thus, a chord-wise gap may be provided between the shear web arranged closest to the root end of the blade and an adjacent shear web closer to the tip end of the blade. Similarly, a chord-wise gap may be provided between the latter and an adjacent shear web yet closer to the tip end of the blade, and so on, up to the shear web closest to the tip end. The present inventors have found that this constitutes a simple and effective arrangement of shear webs which results in improved structural stability and easy of manufacturing and assembly, in particular for segmented wind turbine blades.

Preferably, the shear webs are arranged substantially parallel to each other, i.e. such that the respective side surfaces of the shear webs are substantially parallel to each other. In some embodiments, a first subset of the plurality of shear webs forms a leading edge shear web arrangement or line-up, while a second subset of the plurality of shear webs forms a trailing edge shear web arrangement, wherein the shear webs in each of the respective subsets are arranged substantially parallel to each other. In other embodiments, the shear webs of both subsets are arranged substantially parallel to each other.

It is preferred that the shear webs are arranged substantially perpendicular to the chordwise direction of the blade. In embodiments with two or more groups, subsets or line-ups of the plurality of shear webs, it is preferred that both or all groups, subsets or line-ups are arranged substantially perpendicular to the chordwise direction of the blade.

It is preferred that the shear webs are arranged substantially parallel to the longitudinal axis of the shell body. The longitudinal axis is a line extending between the root and the tip of the shell body, such as a pressure side shell half. The longitudinal axis may be a straight line for shell bodies having a straight, linear design or an at least partially curved line for shell bodies having a non-linear design. In embodiments where a first subset of the plurality of shear webs forms a leading edge shear web arrangement or line-up, while a second subset of the plurality of shear webs forms a trailing edge shear web arrangement, it is preferred that the shear webs of both subsets are arranged substantially parallel to the longitudinal axis of the shell body.

The pressure side shell member and the suction side shell member will typically be adhered or bonded to each other near the leading edge and near the trailing edge. The shell body may comprise longitudinally/spanwise extending load carrying structures, such as one or more main laminates or spar caps. Advantageously, the plurality of shear webs, or a subset thereof, are successively arranged along such main laminate or spar cap.

Load carrying structures such as main laminates are typically formed as fibre insertions comprising a plurality of fibre reinforcement layers, for example, between 20 and 50 layers. On each side of the load carrying structure, the blade typically comprises a sandwich structure with a core material, such as balsa wood or foamed polymer, and with an inner and outer skin made of fibre reinforced polymer. The shell body is typically made of a fibre reinforced polymer material. The reinforcement fibres may for instance be glass fibres, carbon fibres, aramid fibres, metallic fibres, such as steel fibres, or plant fibres, whereas the polymer for instance may be epoxy, polyester or vinyl ester.

In some embodiments, the shear webs of the present invention are substantially I-shaped. Alternatively, the shear webs may be substantially C-shaped. Each shear web will typically comprise a core member which will usually comprise a foamed polymer and/or balsa wood. The shear webs may also comprise web skins that will typically comprise glass fibres, aramid fibres, carbon fibres or combinations thereof. Preferably, the web skins comprise, or consists of, glass fibres. Typically, the shear web is an elongated element. The shear web body is usually an elongated body that—when mounted in the wind turbine blade shell—extends in the longitudinal or spanwise direction of the wind turbine blade.

The shear webs of the present invention may have a length of 0.5-25 metres, such as 0.5-15 metres. They will typically be manufactured using a shear web mould system comprising a central moulding portion for forming at least a part of the web body, a first moulding plate for forming at least a part of the first web foot flange, and a second moulding plate for forming at least a part of the second web foot flange. It is preferred that the shear webs of the present invention are manufactured via a Vacuum Assisted Resin Transfer Moulding (VARTM) process. Alternatively, an RTM process could be used, wherein resin is injected into the mould cavity by use of over-pressure.

The shear webs of the present invention may also comprise one or more inserts to provide a gradual transition from the web body to the first and or the second web foot flange. A first insert may for instance be provided at a first side of the core material and a second insert at a second side of the core material. One or more of the inserts may advantageously be substantially wedge shaped. Thus, the insert may have an overall trapezoid appearance. In an advantageous embodiment, the inserts have a rounded outer surface such that a round transition is obtained from the web body to the web foot flanges.

The height of the respective shear webs will usually decrease from the root end to the tip end. Also, the height of the shear web at the end closer to the root end will usually be equal or higher than the height of the shear web at its opposing end, closer to the tip end of the blade.

In a preferred embodiment, adjacent shear webs overlap along a distance of 5-25%, preferably 10-20%, of their respective spanwise extent.

According to another embodiment, the gap in the chordwise direction has a width of 0.5-10%, such as 0.5-8%, 0.5-5% or 1-5%, of the chord length at the location of the gap. In other embodiments the gap in the chordwise direction has a width of 500 mm or less, such as 250 mm or 100 mm or less. It is preferred that the gap in the chordwise direction has a width of 1-100 mm.

In a preferred embodiment, the plurality of shear webs is grouped into a leading edge shear web line-up and a trailing edge shear web line-up, the trailing edge shear web line-up being closer to the trailing edge than the leading edge shear web line-up, wherein in each of said line-ups, a group of shear webs is successively arranged spanwise within the shell body such that adjacent shear webs overlap along part of their spanwise extent, the overlap including one recess facing the tip end, formed in one shear web, and one recess facing the root end, formed in the adjacent shear web, wherein a gap (88) in the chordwise direction is provided between adjacent shear webs (70). It is preferred that the leading edge shear web line-up is substantially parallel to the trailing edge shear web line-up. The leading edge shear web line-up may comprise 2-10, such as 2-7 shear webs, and the trailing edge shear web line-up may comprise 2-10, such as 2-7 shear webs. The chordwise distance between the leading edge shear web line-up and the trailing edge shear web line-up may be at least 1 meter, at least 3 meters or at least 5 meters.

According to another embodiment, the blade comprises 2-10, preferably 4-8 shear webs, per leading edge shear web line-up or trailing edge shear web line-up.

In a preferred embodiment, the blade comprises a first blade segment and a second blade segment, wherein each of the first and second blade segments comprises a pressure side shell member, a suction side shell member and at least one of the plurality of shear webs. The first and second blade segments may include respective ends with complimentary joint sections that are joinable at a chord-wise joint. It is preferred that each of the first and second blade segments comprises at least two of the plurality of shear webs. In a preferred embodiment, at least one, preferably at least two, shear webs of the first blade segment extend into the second blade segment, and vice-versa. It is preferred that the first blade segment is joined or adhered to the second blade segment.

According to another embodiment, at least one of the shear webs arranged within the first blade segment overlaps with at least one of the shear webs arranged within the second blade segment along part of its spanwise extent, the overlap including one recess facing the tip end, formed in the shear web of the first blade segment, and one recess facing the root end, formed in the adjacent shear web of the second blade segment, wherein a gap in the chordwise direction is provided between the shear web arranged within the first blade segment and the adjacent shear web arranged within the second blade segment.

In a preferred embodiment, the blade comprises spar caps or main laminates provided along the respective pressure and suction side shell members. The spar caps are usually affixed to the inner faces of the shell members. Advantageously, the shear webs spans between the spar caps.

According to another embodiment, each shear web comprising a web body, a first web foot flange at a first end of the web body, and a second web foot flange at a second end of the web body.

According to another embodiment, the web body comprises a first web skin and a second web skin, each web skin comprising one or more fibre layers, and a core member sandwiched in between the first and second web skins.

In another aspect, the present invention relates to a method for assembling a wind turbine blade at least from a first and a second blade segment, wherein each of the blade segments has a pressure side shell member, a suction side shell member, and one or more shear webs arranged within each blade segment, the method comprising moving the blade segments into a joining configuration wherein a shear web of the first blade segment is arranged spanwise adjacent to a shear web of the second blade segment such that the shear webs of the first blade segment overlaps with the shear web of the second blade segment along part of the spanwise extent of said shear webs, wherein a gap in the chordwise direction is provided between said shear webs, and joining the blade segments. The present invention also relates to a wind turbine blade obtainable by said method.

The joining step may be carried out using any suitable joining mechanism or process, including adhesives, bonding material, mechanical fasteners, and any combination of the same.

According to one embodiment, one or more of the plurality of shear webs comprises a recess at its end facing towards the root end and/or its end facing towards the tip end of the blade. In a preferred embodiment, the recess has a parabolic or semi-circular shape.

In a preferred embodiment of the method, each shear web comprising an end surface facing the tip end and an opposing end surface facing the root end of the blade, wherein each shear web comprises a recess in the end surface facing the tip end and/or a recess in the opposing end surface facing the root end of the blade, the recess having a parabolic or semi-circular shape as seen in a side view of the shear web, the plurality of shear webs being successively arranged spanwise within the shell body such that adjacent shear webs overlap along part of their spanwise extent, the overlap including one recess facing the tip end, formed in one shear web, and one recess facing the root end, formed in the adjacent shear web, wherein a gap in the chordwise direction is provided between adjacent shear webs.

All features and/or embodiments discussed above with respect to the wind turbine blade of the present invention may likewise apply to the method for assembling a wind turbine blade according to the present invention.

As used herein, the term "spanwise" is used to describe the orientation of a measurement or element along the blade from its root end to its tip end. The term "chord-wise" is used to describe the orientation of an element or measurement along the blade from its leading edge to its trailing edge.

As used herein, the term "side view" refers to a view that looks horizontally and directly at a side of the shear web, i.e. directly at the side surface of the shear web, which is usually, the main and largest surface of a shear web. The side surface usually lies in a substantially vertical plane including the longitudinal axis or spanwise extent of the shear web.

DESCRIPTION OF THE INVENTION

Figure 2:
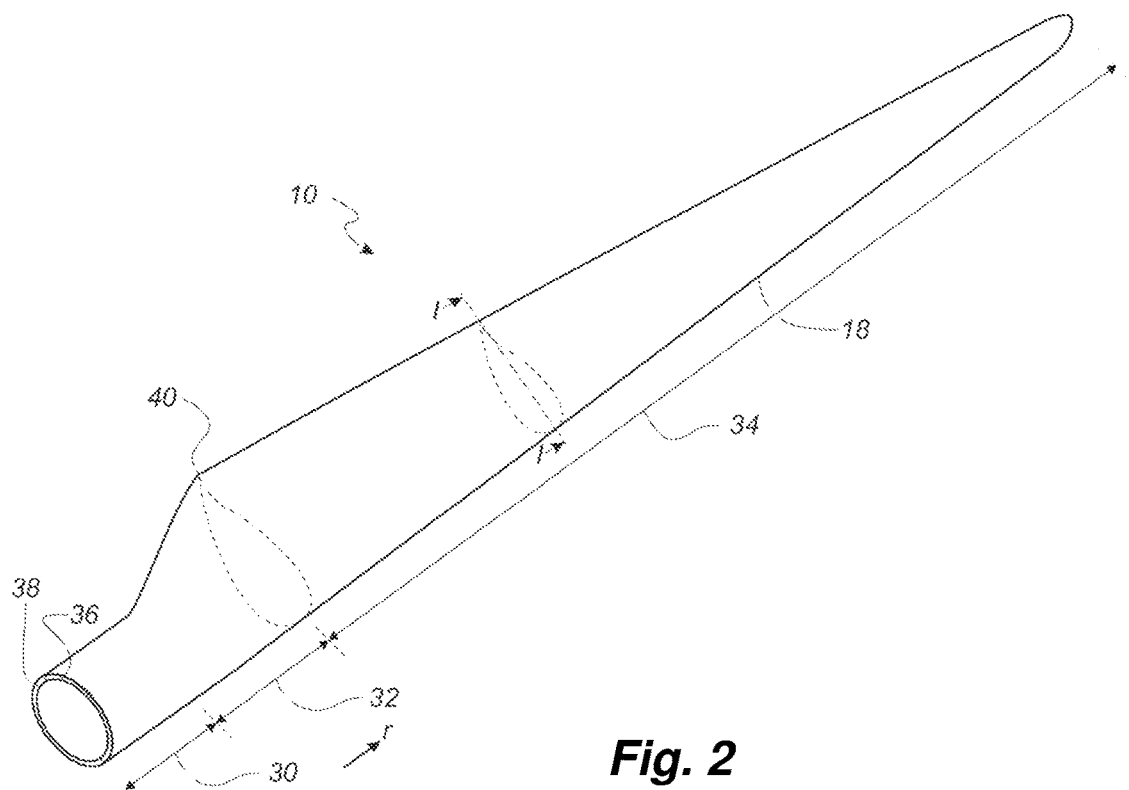
Figure 3:
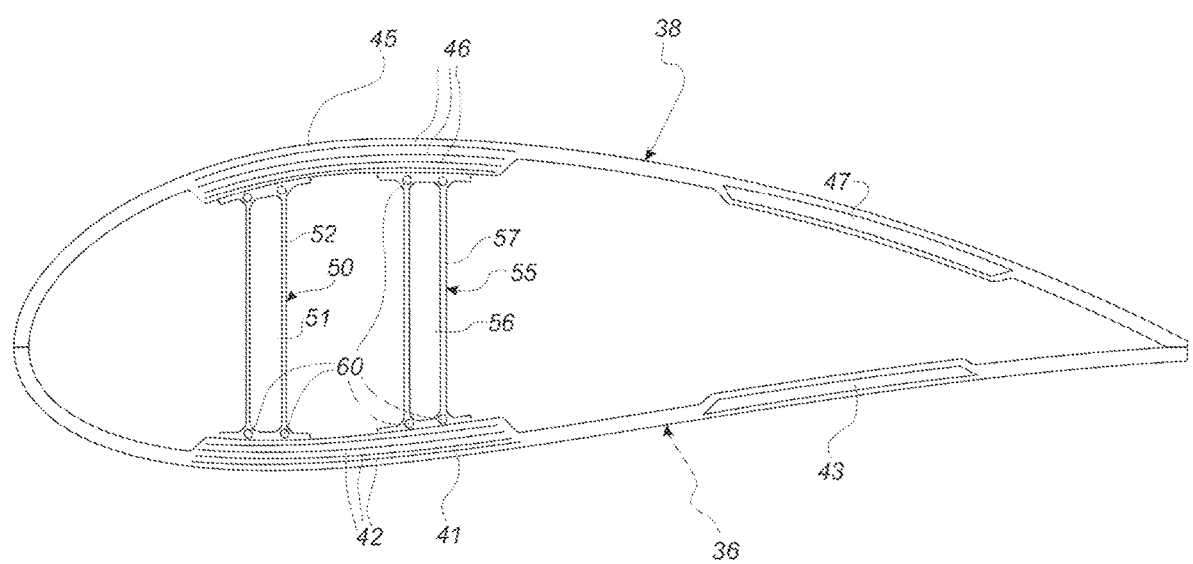
Figure 4:
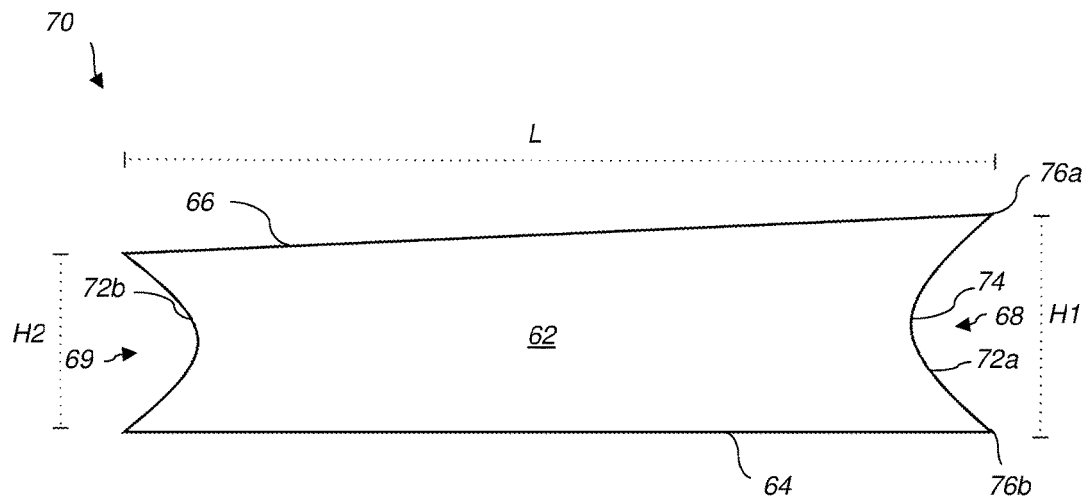
Figure 5:
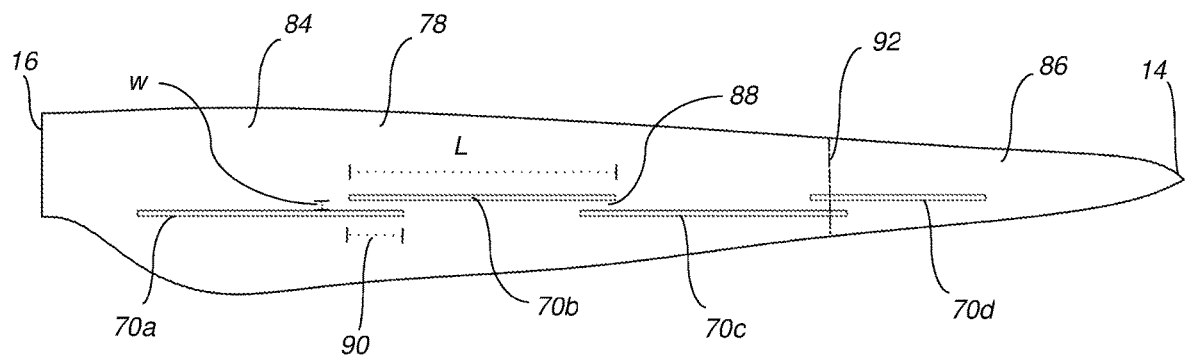
Figure 6:
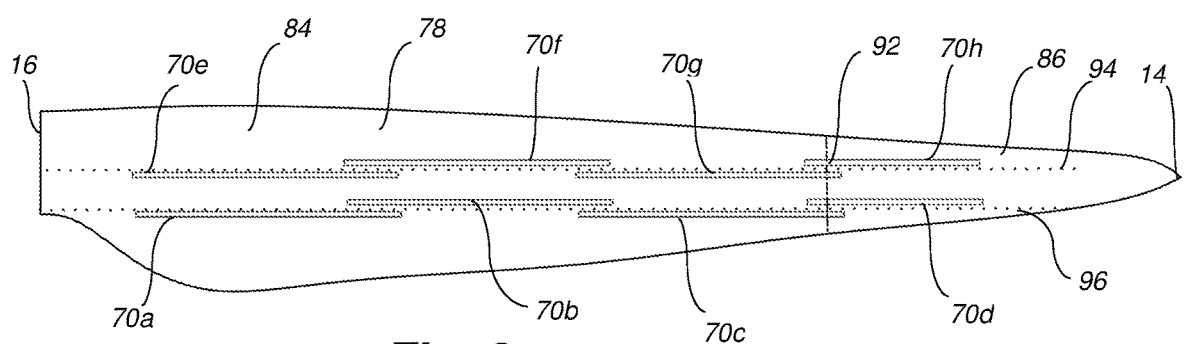

The invention is explained in detail below with reference to an embodiment shown in the drawings, in which FIG. 1 shows a wind turbine, FIG. 2 shows a schematic view of a wind turbine blade, FIG. 3 shows a schematic view of a cross-section of a wind turbine blade, FIG. 4 is a schematic side view of a shear web according to the present invention, FIG. 5 is a schematic top view of a shell member with a plurality of shear webs arranged according to the present invention, FIG. 6 is a schematic top view of a shell member with a plurality of shear webs arranged according another embodiment of the present invention, FIG. 7 is a perspective view of an arrangement of shear webs according to the present invention, and FIG. 8 is a schematic side view of an arrangement of shear webs according to the present invention.

DETAILED DESCRIPTION

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

FIG. 3 shows a schematic view of a cross section of the blade along the line I-I shown in FIG. 2. As previously mentioned, the blade 10 comprises a pressure side shell part 36 and a suction side shell part 38. The pressure side shell part 36 comprises a spar cap 41, also called a main laminate, which constitutes a load bearing part of the pressure side shell part 36. The spar cap 41 comprises a plurality of fibre layers 42 mainly comprising unidirectional fibres aligned along the longitudinal direction of the blade in order to provide stiffness to the blade. The suction side shell part 38 also comprises a spar cap 45 comprising a plurality of fibre layers 46. The pressure side shell part 38 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers. The second shear web 55 has a similar design with a shear web body and two web foot flanges, the shear web body comprising a sandwich core material 56 covered by a number of skin layers 57 made of a number of fibre layers. The sandwich core material 51, 56 of the two shear webs 50, 55 may be chamfered near the flanges in order to transfer loads from the webs 50, 55 to the main laminates 41, 45 without the risk of failure and fractures in the joints between the shear web body and web foot flange. However, such a design will normally lead to resin rich areas in the joint areas between the legs and the flanges. Further, such resin rich area may comprise burned resin due to high exothermic peeks during the curing process of the resin, which in turn may lead to mechanical weak points.

In order to compensate for this, a number of filler ropes 60 comprising glass fibres are normally arranged at these joint areas. Further, such ropes 60 will also facilitate transferring loads from the skin layers of the shear web body to the flanges. However, according to the invention, alternative constructional designs are possible.

The blade shells 36, 38 may comprise further fibre-reinforcement at the leading edge and the trailing edge. Typically, the shell parts 36, 38 are bonded to each other via glue flanges in which additional filler ropes may be used (not shown). Additionally, very long blades may comprise sectional parts with additional spar caps, which are connected via one or more additional shear webs.

FIG. 4 is a schematic side view of a shear web 70 according to the present invention. The shear web 70 has a side surface 62 extending between an upper edge 66, a lower edge 64, a first end surface 68 and a second end surface 69. When arranged within a blade shell body, the first end surface 68 will typically face towards the root end of the blade, while the second end surface 69 will typically face towards the tip end of the blade.

The shear web 70 of FIG. 4 comprises a recess 72a at its end surface 68 facing towards the root end of the blade and a recess 72b at its end surface 69 facing towards the tip end of the blade. Both recesses 72a, 72b have a parabolic shape which is defined by a base section 74 and opposing tip sections 76a, 76b, each tapering towards the end of the shear web. FIG. 4 also illustrated the length L, or spanwise extent, of the shear web, as well as the height H1 at the first end 68 and the height H2 at the second end 69 of the shear web.

FIG. 5 is a schematic top view of a shell member 78, such as a pressure side shell member, with a plurality of shear webs 70a-d arranged according to the present invention. The shell member 78 extends in a spanwise direction between a tip end 14 and a root end 16. A plurality of shear webs 70a-d is successively arranged spanwise within the shell body such that adjacent shear webs, for example shear web 70b and shear web 70c, overlap along part of their spanwise extent or length L, as indicated by distance 90 of overlap. Adjacent shear webs may overlap along a distance of, for example, 10-20%, of their respective spanwise extent L.

As further illustrated in FIG. 5, a gap 88 in the chordwise direction is provided between adjacent shear webs (illustrated only for shear webs 70b, 70c). The width w of the gap 88 in the chordwise direction may be in the range of 0.5-10% of the chord length at the location of the gap 88. In the illustrated embodiment, the shell member 78 comprises two blade segments 84, 86, which together with their respective suction side shell members may be joined to form the wind turbine blade. The first blade segment 84 comprises three shear webs 70a-c, and the second blade segment 86 comprises one shear web. When joined together along line 92, the shear web 70d of the second blade segment extends into the first blade segment 84, and the shear web 70c of the first blade segment 84 extends into the second blade segment 86. Thus, the blade may be assembled by moving the blade segments 84,86 into a mating configuration wherein shear web 70c is arranged spanwise adjacent to shear web 70d of the second blade segment 86 such that the adjacent shear webs 70c, 70d overlap along part of their spanwise extent L, wherein a gap in the chordwise direction is provided between the adjacent shear webs 70c, 70d. The blade sections can then be joined.

FIG. 6 illustrates another embodiment of the present invention. Here, a first subset 70e-h of the plurality of shear webs forms a leading edge shear web arrangement or line-up, while a second subset 70a-d of the plurality of shear webs forms a trailing edge shear web arrangement. In each subset, the shear webs are successively arranged spanwise along or next to a linear or curved path 94, 96, extending between the root end 16 and the tip end 14 of the blade, such that adjacent shear webs overlap along part of their spanwise extent.

FIG. 7 is a perspective view of an arrangement of shear webs according to the present invention. The shear webs 70a-d are arranged between spar caps 79a, 79b, which are provided along the respective pressure and suction side shell members (not shown in FIG. 7), such that a gap 88 in the chordwise direction is provided between adjacent shear webs, e.g. shear web 70d and shear web 70c.

FIG. 8 is a cut-open side view of another arrangement of shear webs according to the present invention. The first three shear webs 70a-c have approximately the same spanwise extent L1, L2, L3, while the shear webs 70d, 70e closer to the tip end 82 of the blade have a shorter spanwise extent L4, L5. Adjacent shear webs, for example webs 70a and 70b, overlap along part of their spanwise extent L1, L2, over a distance indicated at 90.

The invention is not limited to the embodiments described herein, and may be modified or adapted without departing from the scope of the present invention.

LIST OF REFERENCE NUMERALS 4 tower
6 nacelle
8 hub
10 blades
14 blade tip
16 blade root
18 leading edge
20 trailing edge
30 root region
32 transition region
34 airfoil region
36 pressure side shell part
38 suction side shell part
40 shoulder
41 spar cap
42 fibre layers
43 sandwich core material
45 spar cap
46 fibre layers
47 sandwich core material
50 first shear web
51 core member
52 skin layers
55 second shear web
56 sandwich core material of second shear web
57 skin layers of second shear web
60 filler ropes
62 side surface of shear web
64 lower edge
66 upper edge
68 first end surface
69 second end surface
70 shear web
72 recess
74 base section
76 tip sections
78 shell member
79 spar cap
80 root end
82 tip end
84 first blade segment
86 second blade segment
88 gap
90 distance of overlap
92 separation line
94 first path
96 second path
H height
L length
r distance from hub
R rotor radius
w width of gap

The invention claimed is:

1. A wind turbine blade (10) having a profiled contour including a pressure side and a suction side, and a leading edge and a trailing edge with a chord having a chord length extending therebetween, the wind turbine blade extending in a spanwise direction between a root end (80) and a tip end (82), wherein the blade comprises a shell body with at least one pressure side shell member (36) and at least one suction side shell member (38), and a plurality of shear webs (70) arranged within the shell body, each shear web comprising an end surface facing the tip end (82) and an opposing end surface facing the root end (80) of the blade,
wherein each shear web (70) comprises a recess (72) in the end surface facing the tip end (82) and/or a recess (72) in the opposing end surface facing the root end (80) of the blade, wherein each of the recesses (72) of each of the shear webs (70) has a parabolic or semi-circular shape as seen in a side view of the respective one of the shear webs (70), and wherein each of the recesses (72) is defined by a base section (74) and a pair of opposing tapering tip sections (76a, 76b),
the plurality of shear webs (70) being successively arranged spanwise within the shell body,
wherein a gap (88) in the chordwise direction is provided between adjacent shear webs (70),
wherein the plurality of shear webs (70) is grouped into a leading edge shear web line-up (70e-h) and a trailing edge shear web line-up (70a-d), the trailing edge shear web line-up being closer to the trailing edge than the leading edge shear web line-up,
wherein in each of the leading edge shear web line-up and the trailing edge shear web line-up, a group of the shear webs (70) is successively arranged spanwise within the shell body such that adjacent ones of the shear webs overlap along part of their spanwise extent (L), the overlap including one recess facing the tip end, formed in one of the adjacent shear webs, and one recess facing the root end, formed in the other one of the adjacent shear webs,
wherein, within the overlap, a most inward point of the recess facing the tip end does not extend further than 1000 mm beyond a most inward point of the recess facing the root end, and.

2. The wind turbine blade according to claim 1, wherein each of the shear webs comprises the one recess in the end surface facing the tip end and the one recess in the opposing end surface facing the root end of the blade, each of the recesses having a parabolic or semi-circular shape as seen in a side view of the shear web.

3. The wind turbine blade according to claim 1, wherein the shear webs are successively arranged spanwise along a linear or curved path extending between the root end and the tip end of the blade, wherein said linear or curved path is substantially perpendicular to the chordwise direction.

4. The wind turbine blade according to claim 1, wherein the adjacent ones of the shear webs (70a, 70b) overlap along a distance (90) of 5-25% of their respective spanwise extent (L).

5. The wind turbine blade according to claim 4, wherein the distance (90) comprises 10-20% of the respective spanwise extent (L).

6. The wind turbine blade according to claim 1, wherein the gap (88) in the chordwise direction has a width of 0.5-10% of the chord length at the location of the gap (88).

7. The wind turbine blade according to claim 1, wherein the blade comprises 2-10, of the shear webs per the leading edge shear web line-up or per the trailing edge shear web line-up.

8. The wind turbine blade according to claim 7, wherein the blade comprises 4-8 shear webs per each of the leading edge shear web line-ups or the trailing edge shear web line-ups.

9. The wind turbine blade according to claim 1, comprising a first blade segment and a second blade segment, wherein each of the first and second blade segments comprises a pressure side shell member, a suction side shell member and at least one of the plurality of shear webs.

10. The wind turbine blade according to claim 9, wherein the at least one of the shear webs arranged within the first blade segment overlaps with the at least one of the shear webs arranged within the second blade segment along part of its spanwise extent, the overlap including one recess facing the tip end, formed in the at least one shear web of the first blade segment, and one recess facing the root end, formed in the adjacent at least one shear web of the second blade segment, wherein the gap in the chordwise direction is provided between the at least one shear web arranged within the first blade segment and the adjacent at least one shear web arranged within the second blade segment.

11. The wind turbine blade according to claim 1, wherein the blade comprises spar caps provided along the respective pressure and suction side shell members.

12. The wind turbine blade according to claim 1, wherein each of the shear webs comprises a web body, a first web foot flange at a first end of the web body, and a second web foot flange at a second end of the web body.

13. The wind turbine blade according to claim 12, wherein the web body comprises a first web skin and a second web skin, each of the first and second web skins comprising one or more fibre layers, and a core member sandwiched in between the first and second web skins.

14. A method for assembling a wind turbine blade at least from a first and a second blade segment, wherein each of the blade segments has a pressure side shell member, a suction side shell member, and one or more shear webs arranged within each of the blade segments, the method comprising:
    moving the blade segments into a joining configuration wherein one of the one or more shear webs of the first blade segment is arranged spanwise adjacent to one of the one or more shear webs of the second blade segment such that the shear web of the first blade segment overlaps with the shear web of the second blade segment along part of the spanwise extent of said shear webs, wherein a gap in the chordwise direction is provided between said shear webs; and
    joining the blade segments,
    wherein the one or more shear webs of the first and second blade segments each comprise a recess at an end facing towards a root end and a recess at an end facing towards a tip end of the wind turbine blade, each of the recesses having a parabolic or semi-circular shape, and
    wherein each of the recesses is defined by a base section and a pair of opposing tapering tip sections and, within the overlap, a most inward point of the recess facing the tip end does not extend further than 1000 mm beyond a most inward point of the recess facing the root end.

* * * * *

UNITED STATES PATENT AND TRADEMARK OFFICE
CERTIFICATE OF CORRECTION

PATENT NO. : 11,519,383 B2  
APPLICATION NO. : 17/284148  
DATED : December 6, 2022  
INVENTOR(S) : Andrea Avaldi Page 1 of 1

It is certified that error appears in the above-identified patent and that said Letters Patent is hereby corrected as shown below:

In the Claims

Claim 1, Column 11, Line 34, please delete the phrase "facing the root end, and" and replace with ""facing the root end".

Signed and Sealed this  
Seventh Day of February, 2023

Katherine Kelly Vidal  
*Director of the United States Patent and Trademark Office*